UNITED STATES PATENT OFFICE.

EUGEN OSTERMAYER, OF ERFURT, PRUSSIA, GERMANY.

PRODUCTION OF IODIZED SULPHO-ACIDS OF PHENOLS, &c.

SPECIFICATION forming part of Letters Patent No. 393,388, dated November 27, 1888.

Application filed December 3, 1887. Serial No. 256,918. (Specimens.) Patented in France October 31, 1887, No. 186,699; in Belgium November 17, 1887, No. 79,586, and in Italy March 30, 1888, XXI, 22,901, and XLV, 388.

*To all whom it may concern:*

Be it known that I, Doctor EUGEN OSTERMAYER, chemist and manufacturer, a subject of the King of Würtemberg, residing at Erfurt, 4 Weissfrauengasse, Prussia, German Empire, have invented certain new and useful Improvements in the Production of Iodized Sulpho-acids of Phenol, Cresol, and Thymol, (for which I have obtained Letters Patent in France dated October 31, 1887, No. 186,699; in Belgium dated November 17, 1887, No. 79,586, and in Italy dated March 30, 1888, Vol. 21, No. 22,901, and Vol. 45, No. 388;) and I do hereby declare the following to be a full, clear, and exact description of the invention, such as will enable others skilled in the art to which it appertains to make and use the same.

The invention relates to the production of iodinized phenol, cresol, and thymol supho-acids; and it consists in the process of obtaining the same, substantially as hereinafter fully decribed and claimed.

If the well-known phenol sulpho-acids or the salts thereof are treated with equivalent quantities of iodine in the form of iodic acid and iodine, or iod-iodide of potassium, or chloride of iodine or iodide of potassium in solution in hydrochloric acid, or with the salts of iodine in presence of an oxidizing agent, preferably with a solution obtained by dissolving iodide of potassium in water, hydrochloric acid, and sodium nitrite, or by introducing chlorine in the water holding the iodine in suspension, the separation of a mixture of several iodinized sulpho-acids takes place in a short time, which may be separated from the liquor by fractional crystallization. The cresol and thymol sulpho-acids behave in a like manner, but are more difficult to separate from one another.

The process may be carried out as follows: For instance, 16.5 kilograms of potassium iodide are dissolved in ten kilograms of water, to which fifty-two kilograms of hydrochloric acid are added, and subsequently and gradually seven kilograms of sodium nitrite. The solution so obtained is mixed with twenty-one kilograms of a solution of paraphenol sulpho-acid of potash and sixty kilograms of water. After a comparatively short time the separation begins of an iod-paraphenol sulpho-acid that is not readily soluble in water, and which is filtered off. The remaining lye is evaporated at a gentle heat, and upon cooling the readily-soluble iod-paraphenol sulpho-acids separate. The raw acids are preferably purified by converting them into their salts of baryta. The difficultly-soluble acid crystallizes from hot water in beautiful colorless columnar needles, while the more readily soluble acid crystallizes out in the form of colorless scales. The iod-orthophenol sulpho-acids are treated in the same manner as the para combinations. Here, also, an acid difficultly soluble in water crystallizes out first, and then the more readily soluble acid on evaporation of the mother-lye after the elimination of the first-named acid, and which may be obtained in a pure form by recrystallization. The difficultly-soluble acid crystallizes in the form of needles or lamellæ, or, more properly, leaflets, while the readily-soluble acid forms crystalline crusts. In the manner described the iod-cresol sulpho-acids are obtained, one of the acids crystallizing in the form of colorless bundles of needles. The iod-thymol sulpho-acid also is obtained in a similar manner. It is extremely soluble in water and crystallizes from alcohol in the form of small prisms. Upon evaporation of an aqueous solution of the acid and at a given concentration of the solution the acid is decomposed, coloring the solution blue, and partly under re-formation of thymol, while the potash-salt forms stable and colorless needles.

The chemical process that takes place in the operations above referred to is based upon the fact that by the simultaneous action of iodine, sodium, nitrite, and hydrochloric acid chloride of iodine in solution of hydrochloric acid is formed, which in all probability reacts upon the phenol sulpho-acid salts, according to the following equations:

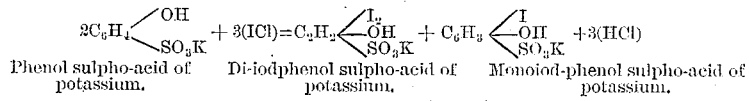

Phenol sulpho-acid of potassium.    Di-iodphenol sulpho-acid of potassium.    Monoiod-phenol sulpho-acid of potassium.

The reactions proceed in a similar manner, so far as iod-cresol and iod-thymol sulpho-acids are concerned; but here the monoiod sulpho-acids are principally obtained. For example:

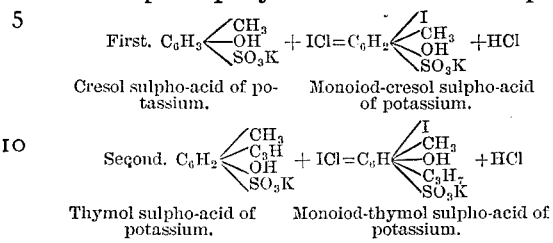

First. Cresol sulpho-acid of potassium → Monoiod-cresol sulpho-acid of potassium.

Second. Thymol sulpho-acid of potassium → Monoiod-thymol sulpho-acid of potassium.

The free acids are obtained from the corresponding barium salts. The production of the phenol, cresol, or thymol sulpho-acid barium salts is effected by the simple addition of a solution of barium chloride to the aqueous solution of the potassium salts of the above acids so long as a precipitate results. The barium salt so obtained is then suspended in water and decomposed by a proper amount of sulphuric acid, whereby insoluble barium sulphate, which precipitates, and free iodinized thymol, cresol, or thymol sulpho-acid is formed.

Having described my invention, what I claim is—

The process of obtaining iodinized phenol, cresol, or thymol sulpho-acids, which consists in treating the respective sulpho-acids or their salts with iodine or a salt of iodine in presence of an oxidizing agent, or with the described equivalent means, substantially as set forth.

In testimony whereof I affix my signature in presence of two witnesses.

EUGEN OSTERMAYER.

Witnesses:
CARL BORNGRAEBER,
ERNST SCHOLZ.